United States Patent
Wang

(10) Patent No.: US 12,168,633 B2
(45) Date of Patent: Dec. 17, 2024

(54) HEAT-INSULATING AND FLAME-RETARDANT NANO-COMPOSITE SHEET AND PREPARATION METHOD THEREOF

(71) Applicant: GUOJIA GEL TECHNOLOGY INNOVATION CENTER (SHENZHEN) CO., LTD., Shenzhen (CN)

(72) Inventor: Haibo Wang, Shenzhen (CN)

(73) Assignee: GUOJIA GEL TECHNOLOGY INNOVATION CENTER (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/598,020

(22) Filed: Mar. 7, 2024

(65) Prior Publication Data

US 2024/0208872 A1 Jun. 27, 2024

Related U.S. Application Data

(63) Continuation of application No. PCT/CN2023/111641, filed on Aug. 8, 2023.

(30) Foreign Application Priority Data

Dec. 8, 2022 (CN) .............................. 202211570931

(51) Int. Cl.
| | | |
|---|---|---|
| C04B 35/82 | (2006.01) | |
| C04B 35/622 | (2006.01) | |
| C04B 35/624 | (2006.01) | |
| C04B 35/626 | (2006.01) | |
| C04B 35/636 | (2006.01) | |

(52) U.S. Cl.
CPC ........ *C04B 35/82* (2013.01); *C04B 35/62218* (2013.01); *C04B 35/624* (2013.01); *C04B 35/6264* (2013.01); *C04B 35/62655* (2013.01); *C04B 35/6365* (2013.01); *C04B 2235/3206* (2013.01); *C04B 2235/3272* (2013.01); *C04B 2235/3418* (2013.01); *C04B 2235/48* (2013.01); *C04B 2235/522* (2013.01); *C04B 2235/9607* (2013.01)

(58) Field of Classification Search
CPC .............. C04B 35/82; C04B 35/62218; C04B 35/62655; Y02E 60/10
USPC ........................................................ 264/129
See application file for complete search history.

(56) References Cited

U.S. PATENT DOCUMENTS

| | | |
|---|---|---|
| 2012/0037838 A1 | 2/2012 | Bauer et al. |
| 2018/0112134 A1 | 4/2018 | Chen |
| 2020/0215791 A1 | 7/2020 | Oh et al. |
| 2021/0332242 A1 | 10/2021 | Chen |

FOREIGN PATENT DOCUMENTS

| | | |
|---|---|---|
| CN | 106832439 A | 6/2017 |
| CN | 106928908 A | 7/2017 |
| CN | 110527134 A | 12/2019 |
| CN | 111440557 A | 7/2020 |
| CN | 111873564 A | 11/2020 |
| CN | 112500770 A | 3/2021 |
| CN | 113443889 A | 9/2021 |
| CN | 113943171 A | 1/2022 |
| CN | 114516208 A | 5/2022 |
| CN | 115772338 A | 3/2023 |
| EP | 3281968 A1 | 2/2018 |
| KR | 101938655 B1 | 1/2019 |

OTHER PUBLICATIONS

High-Silica Glass, ScienceDirect, Polymer Matrix Composites and Technology, 2011. (Year: 2011).*
Zhang Wei, et al., Application Progress of Silica Aerogel Insulation Composite Materials in Building Energy Efficiency, Plastic Industry, 2016, pp. 10-14, 25, vol. 44 No. 5.
GB/T 2406.2-2009/ISQ 4589-2:1996, Plastics—Determination of burning behaviour by oxygen index—Part 2: Ambient—temperature test, China National Standards, 2009, pp. 1-20, General Administration of Quality Supervision, Inspection and Quarantine of the People's Republic of China China National Standardization Administration Committee.

* cited by examiner

*Primary Examiner* — Hannah J Pak
(74) *Attorney, Agent, or Firm* — Bayramoglu Law Offices LLC

(57) ABSTRACT

A heat-insulating and flame-retardant nano-composite sheet and a preparation method thereof are provided. The preparation method includes the following steps: S1: adding aerogel slurry, a flame retardant, an opacifying agent, fumed silica, high-silica glass fiber, and an additive A into a stirring tank; and stirring until uniformly mixed to acquire pasty composite slurry; S2: filling a glue tray of a roller coating device with the composite slurry acquired in step S1; and scrape-coating surfaces of a plurality of layers of a base material with the composite slurry by using discharging assemblies of the roller coating device; S3: drawing and collecting the plurality of layers of the base material acquired in step S2 at a compounding position; and pressurizing to acquire a semi-finished product; and S4: drawing the semi-finished product acquired in step S3 onto a coating line; and carrying out high-temperature drying to acquire the heat-insulating and flame-retardant nano-composite sheet.

10 Claims, No Drawings

HEAT-INSULATING AND FLAME-RETARDANT NANO-COMPOSITE SHEET AND PREPARATION METHOD THEREOF

CROSS REFERENCE TO THE RELATED APPLICATIONS

This application is a continuation application of International Application No. PCT/CN2023/111641, filed on Aug. 8, 2023, which is based upon and claims priority to Chinese Patent Application No. 202211570931.6, filed on Dec. 8, 2022, the entire contents of which are incorporated herein by reference.

TECHNICAL FIELD

The present invention belongs to the field of heat insulation technologies for new energy resources, and particularly relates to a heat-insulating and flame-retardant nano-composite sheet and a preparation method thereof.

BACKGROUND

Power batteries of a new energy vehicle are arranged at the bottom of the vehicle in a specific way and are firmly protected by a metal shell. Due to the properties of the power batteries, a fire occurs when the batteries are overcharged or short-circuited or when a battery management system becomes faulty. In winter, it is easy to generate static electricity and sparks due to dry climate. This may lead to spontaneous combustion of the vehicle. Most of spontaneous combustion of new energy vehicles starts from burning at a power battery position. Because there are many plastic parts at this position, once a line of a vehicle is aged, cracked or has poor contact, short circuit, electricity leakage, liquid leakage, or spark occurs. This may cause spontaneous combustion of the vehicle. In a low-temperature environment, an endurance mileage of an electric vehicle is significantly decreased, or even decreased by more than a half. It is also difficult to charge a low-temperature battery. If the temperature drops below 0° C., the endurance mileage of the electric vehicle may be decreased even by 30% when compared to the endurance mileage of the electric vehicle in normal conditions.

Due to the characteristics of low thermal conductivity, a good heat insulation effect, class-A fire-resistant property, small thickness, light weight and high convenience in use, and the like, an aerogel heat-insulating material can be a good solution to the problem that temperature of a battery pack of a new energy vehicle is too low. An aerogel heat-insulating sheet that is a nano-composite sheet can withstand a 60 minutes' flame penetration test, conforms to an RoHS test standard and generates no toxic and harmful gases under high-temperature conditions. The aerogel heat-insulating sheet whose thickness is only ⅕ to ⅓ of the thickness of a traditional material can achieve the same heat insulation effect as the traditional material, so that more valuable space is saved for a battery pack whose space is limited. The aerogel heat-insulating sheet whose thickness is the same as the thickness of a traditional aerogel heat-insulating material has a more persistent heat insulation effect than the traditional aerogel heat-insulating material. This can effectively solve the problem that the endurance of a new-energy battery pack declines in cold winter, thereby not only improving power utilization efficiency, but also prolonging the service life of the battery pack. In the case of high temperature, if there is no suitable heat dissipation solution, there is a great temperature difference between battery assemblies in a battery pack, and a battery assembly whose temperature is too high affects properties of a neighboring battery assembly. One of serious impacts is that battery overcharge leads to "thermal runaway" that makes an electric vehicle catch fire and explode. A nano-composite sheet having a class-A fire-resistant function can also play a good thermal protection role when there is a fire caused by "thermal runaway" of a new energy vehicle. Therefore, more time is gained for passengers to escape or put out the fire, thereby reducing losses.

An aerogel nano-material is an advanced nano-material having a three-dimensional network structure. A medium filled in a spatial network structure of the aerogel nano-material is air. Therefore, the aerogel nano-material has excellent properties such as extremely low density, low thermal conductivity and high porosity, and has a very broad application prospect in the fields of heat preservation and insulation, energy conservation, and consumption reduction. At present, heat-insulating materials commonly used in power batteries are foam, plastic foam, ultra-fine glass wool, high silica wool, vacuum insulation panel, silica aerogel, and the like. Compared with a traditional heat-insulating sheet of a power battery, the nano-composite sheet has the characteristics of flame retardance, high-temperature resistance, low thermal conductivity, water proofness, moisture proofness, shock proofness, light weight, low price, small thickness, and the like, and does not generate any toxic gas. After high-silica glass fiber having good high-temperature resistance and fire resistance is compounded with an acrogel material, a highly fire-resistant and heat-insulating material that further has an excellent heat-insulating property is acquired.

SUMMARY

A technical problem to be solved by the present invention is to provide a preparation method of a heat-insulating and flame-retardant nano-composite sheet, wherein the nano-composite sheet prepared by the method has good heat-insulating and flame-retardant properties.

To solve the above technical problem, the present invention adopts the following technical solution.

A preparation method of a heat-insulating and flame-retardant nano-composite sheet includes the following steps:
  S1: adding aerogel slurry, a flame retardant, an opacifying agent, fumed silica, high-silica glass fiber, and an additive A into a stirring tank; and carrying out stirring until the materials are mixed uniformly to acquire pasty composite slurry;
  S2: filling a glue tray of a roller coating device with the composite slurry acquired in step S1; and scrape-coating surfaces of a plurality of layers of a base material with the composite slurry by using discharging assemblies of the roller coating device;
  S3: drawing and collecting the plurality of layers of the base material acquired in step S2 at a compounding position; and carrying out pressurization to acquire a semi-finished product; and
  S4: drawing the semi-finished product acquired in step S3 onto a coating line; and carrying out high-temperature drying to acquire the heat-insulating and flame-retardant nano-composite sheet.

Further, in step S1 of the present invention, the aerogel slurry, the flame retardant, the opacifying agent, the fumed silica, the high-silica glass fiber, and the additive A are 50-70 parts by weight, 0.5-10 parts by weight, 0.5-10 parts by weight, 10-20 parts by weight, 5-10 parts by weight, and 0.3-0.6 part by weight, respectively.

Further, in the present invention, the aerogel slurry is composed of silica aerogel powder and a wetting dispersion according to the weight ratio of (15-50):(50-85); and the wetting dispersion is composed of sodium carboxymethyl cellulose, an additive B, water and ethanol according to the weight ratio of 1:1:50:40; the additive B is prepared by the following steps:

adding choline chloride, methanol and calcium hydroxide with the ratio of 1 mol:500 mL:1 mol into a reaction flask; heating the reaction flask to 65° C.; carrying out stirring for reaction for 12 hours to acquire a reaction mixture; cooling the reaction mixture to room temperature; carrying out filtering to acquire a filtrate; performing rotary evaporation on the filtrate to remove the solvent methanol; and carrying out vacuum drying at 100° C. until the weight is constant to acquire the additive B.

Further, in the present invention, the flame retardant is magnesium hydroxide, aluminum hydroxide or an organosilicone flame retardant; and the opacifying agent is one or more of ferrous oxide, carbon black, titanium dioxide, potassium hexatitanate whiskers, zinc oxide, aluminum oxide, magnesium oxide, and aluminum silicate.

Further, in the present invention, the additive A is prepared by the following steps:

adding heptamethyl trisiloxane, methylbenzene, 1,2-epoxy-7-octene and a palladium-carbon catalyst with the ratio of 1 mol:600 mL:1.05 mol:0.004 g into a reaction flask; heating the reaction flask to 85° C.; carrying out stirring for reaction for 8 hours to acquire a reaction liquid; performing rotary evaporation on the reaction liquid to remove the solvent methylbenzene; and carrying out vacuum drying at 80° C. until the weight is constant to acquire the additive A.

Further, in step S2 of the present invention, the number of the discharging assemblies is the same as the number of the layers of the base material, both of which are 5 to 20; the thickness of the composite slurry after scrape coating is 0.3 mm to 0.5 mm; the base material is non-woven fabric, fiberglass felt or pre-oxidized fiber; the thickness of the non-woven fabric is 0.1 mm to 1 mm; the thickness of the fiberglass felt is 0.2 mm to 4 mm; and the thickness of the pre-oxidized fiber is 1 mm to 3 mm.

Further, in step S3 of the present invention, the pressure at the compounding position is 0.3 MPa to 0.8 MPa; and a drawing speed for the plurality of layers of the base material is 1 m/min to 5 m/min.

Further, in step S4 of the present invention, a drawing speed for the semi-finished product is 1 m/min to 5 m/min; and a temperature for the high-temperature drying is 80° C. to 150° C.

The present invention further provides a heat-insulating and flame-retardant nano-composite sheet prepared by the above preparation method.

Compared with the prior art, the present invention has the following beneficial effects.

1) Different from conventional chemical methods such as sol-gel modified drying, methods used in the present invention are physical methods to compound aerogel slurry with a base material efficiently and safely. Compared with traditional heat-insulating products, the product prepared in the present invention can achieve an equivalent heat-insulating effect with the lighter weight and smaller volume. The physical methods include the followings. (1) Convection: when diameters of pores in an aerogel material are less than 70 nm, air molecules in the pores lose the capability of moving freely and adhere to walls of the pores. In this case, the product is in an approximate vacuum condition. (2) Radiation: because all the pores in the aerogel material are nano-scale pores, and the product has an extremely low volume density, the number of pore walls inside the product tends to be "infinite". Therefore, each pore wall has the effect of a "heat shield"; and the product can produce an effect similar to that of "an infinite number of heat shields", and thus radiation heat transfer is decreased to be close to the minimum limit. (3) Heat conduction: because there are an approximately infinite number of nano-pores, and heat flow in solid can be transferred only along pore walls, walls of the approximately infinite number of nano-pores achieve the effect of an "infinitely long way". This makes the heat conduction capability of the solid be decreased to be close to the minimum limit. In addition, the opacifying agent and the high-silica glass fiber are also used in the present invention, wherein the opacifying agent has good absorption and scattering properties when radiating and transferring heat at high temperature, and the high-silica glass fiber has low thermal conductivity. Therefore, the nano-composite sheet prepared by the method in the present invention has an excellent heat-insulating property, and can be applied to the field of heat insulation technologies for new energy resources.

2) In the present invention, choline hydroxide prepared via reaction between choline chloride and calcium hydroxide is also used in the aerogel slurry as the additive B. The additive B can effectively improve dispersity of silica aerogel, thereby further improving the heat-insulating property of the nano-composite sheet.

3) In the present invention, the flame retardant having a good flame-retardant property is used, and the additive A prepared via reaction between heptamethyl trisiloxane and 1,2-epoxy-7-octene under the catalysis of the palladium-carbon catalyst is also added. The additive A can effectively improve dispersity of the flame retardant and other raw materials and increase a binding force of composite slurry to the base material, thereby further improving the flame-retardant property of the nano-composite sheet.

DETAILED DESCRIPTION OF THE EMBODIMENTS

The present invention is described in detail below with reference to the specific embodiments. Herein, schematic embodiments of the present invention and descriptions thereof are intended to explain the present invention, but are not intended to limit the present invention.

Embodiment 1

The heat-insulating and flame-retardant nano-composite sheet is prepared by the following steps:

S1: adding 65 parts of aerogel slurry, 2 parts of magnesium hydroxide, 5 parts of ferrous oxide, 10 parts of fumed silica, 8 parts of high-silica glass fiber, and 0.5 part of an additive A into a stirring tank; and carrying out stirring until the materials are mixed uniformly to acquire pasty composite slurry, wherein the aerogel slurry is composed of silica aerogel powder and a wetting dispersion according to the weight ratio of 50:50; and the wetting dispersion is composed of sodium carboxymethyl cellulose, an additive B, water and ethanol according to the weight ratio of 1:1:50:40;

S2: filling a glue tray of a roller coating device with the composite slurry acquired in step S1; and scrape-coating surfaces of a plurality of layers of a base material with the composite slurry by using discharging assemblies of the roller coating device, wherein the number of the discharging assemblies is the same as the number of the layers of the base material, both of which are 10; the thickness of the composite slurry after scrape coating is 0.5 mm; and the base material is fiberglass felt whose thickness is 0.5 mm;

S3: drawing and collecting the plurality of layers of the base material acquired in step S2 at a compounding position; and carrying out pressurization to acquire a semi-finished product, wherein a pressure at the compounding position is 0.5 MPa; and a drawing speed for the plurality of layers of the base material is 3 m/min; and S4: drawing the semi-finished product acquired in step S3 onto a coating line; and carrying out high-temperature drying at 100° C. to acquire the heat-insulating and flame-retardant nano-composite sheet, wherein a drawing speed for the semi-finished product is 3 m/min.

The additive A is prepared by the following steps:
adding heptamethyl trisiloxane, methylbenzene, 1,2-epoxy-7-octene and a palladium-carbon catalyst according to the ratio of 1 mol:600 mL:1.05 mol:0.004 g into a reaction flask; heating the reaction flask to 85° C.; carrying out stirring for reaction for 8 hours to acquire a reaction liquid; performing rotary evaporation on the reaction liquid to remove the solvent methylbenzene; and carrying out vacuum drying at 80° C. until the weight is constant to acquire the additive A.

The additive B is prepared by the following steps:
adding choline chloride, methanol and calcium hydroxide according to a ratio of 1 mol:500 mL:1 mol into a reaction flask; heating the reaction flask to 65° C.; carrying out stirring for reaction for 12 hours to acquire a reaction mixture; cooling the reaction mixture to room temperature; carrying out filtering to acquire a filtrate; performing rotary evaporation on the filtrate to remove the solvent methanol; and carrying out vacuum drying at 100° C. until the weight is constant to acquire the additive B.

Embodiment 2

The heat-insulating and flame-retardant nano-composite sheet is prepared by the following steps:
S1: adding 70 parts of aerogel slurry, 2 parts of aluminum hydroxide, 2 parts of carbon black, 18 parts of fumed silica, 8 parts of high-silica glass fiber, and 0.4 part of an additive A into a stirring tank; and carrying out stirring until the materials are mixed uniformly to acquire pasty composite slurry, wherein the aerogel slurry is composed of silica acrogel powder and a wetting dispersion according to the weight ratio of 40:60; and the wetting dispersion is composed of sodium carboxymethyl cellulose, an additive B, water and ethanol according to the weight ratio of 1:1:50:40;

S2: filling a glue tray of a roller coating device with the composite slurry acquired in step S1; and scrape-coating surfaces of a plurality of layers of a base material with the composite slurry by using discharging assemblies of the roller coating device, wherein the number of the discharging assemblies is the same as the number of the layers of the base material, both of which are 5; the thickness of the composite slurry after scrape coating is 0.4 mm; and the base material is pre-oxidized fiber whose thickness is 1 mm;

S3: drawing and collecting the plurality of layers of the base material acquired in step S2 at a compounding position; and carrying out pressurization to acquire a semi-finished product, wherein a pressure at the compounding position is 0.5 MPa; and a drawing speed for the plurality of layers of the base material is 2 m/min; and S4: drawing the semi-finished product acquired in step S3 onto a coating line; and carrying out high-temperature drying at 120° C. to acquire the heat-insulating and flame-retardant nano-composite sheet, wherein a drawing speed for the semi-finished product is 2 m/min.

Preparation steps of the additive A and the additive B are the same as those in Embodiment 1.

Embodiment 3

The heat-insulating and flame-retardant nano-composite sheet is prepared by the following steps:
S1: adding 61 parts of aerogel slurry, 2 parts of an organosilicone flame retardant, 4 parts of titanium dioxide, 15 parts of fumed silica, 8 parts of high-silica glass fiber, and 0.6 part of an additive A into a stirring tank; and carrying out stirring until the materials are mixed uniformly to acquire pasty composite slurry, wherein the aerogel slurry is composed of silica aerogel powder and a wetting dispersion according to the weight ratio of 45:55; and the wetting dispersion is composed of sodium carboxymethyl cellulose, an additive B, water and ethanol according to the weight ratio of 1:1:50:40;

S2: filling a glue tray of a roller coating device with the composite slurry acquired in step S1; and scrape-coating surfaces of a plurality of layers of a base material with the composite slurry by using discharging assemblies of the roller coating device, wherein the number of the discharging assemblies is the same as the number of the layers of the base material, both of which are 10; the thickness of the composite slurry after scrape coating is 0.3 mm; and the base material is non-woven fabric whose thickness is 0.5 mm;

S3: drawing and collecting the plurality of layers of the base material acquired in step S2 at a compounding position; and carrying out pressurization to acquire a semi-finished product, wherein a pressure at the compounding position is 0.3 MPa; and a drawing speed for the plurality of layers of the base material is 4 m/min; and S4: drawing the semi-finished product acquired in step S3 ono a coating line; and carrying out high-temperature drying at 100° C. to acquire the heat-insulating and flame-retardant nano-composite sheet, wherein a drawing speed for the semi-finished product is 4 m/min.

Preparation steps of the additive A and the additive B are the same as those in Embodiment 1.

Comparative Example 1.1 differs from Embodiment 1 in that the additive A and its preparation steps are not included.

Comparative Example 1.2 differs from Embodiment 1 in that the additive B and its preparation steps are not included.

Comparative Example 2.1 differs from Embodiment 2 in that the additive A and its preparation steps are not included.

Comparative Example 2.2 differs from Embodiment 2 in that the additive B and its preparation steps are not included.

Comparative Example 3.1 differs from Embodiment 3 in that the additive A and its preparation steps are not included.

Comparative Example 3.2 differs from Embodiment 3 in that the additive B and its preparation steps are not included.

Experimental Example 1: Test for Heat-Insulating Property

1. Record the densities of samples, and clean surfaces of a heating plate and a thick aluminum plate to make the surfaces clean, wherein the test samples are nano-composite sheets prepared according to Embodiments I to Embodiment 3, Comparative Example 1.2, Comparative Example 2.2 and Comparative Example 3.2.
2. Set temperature of a heater to specified temperature of 600±15° C., and start heating.
3. After the temperature of the heater stabilizes at 600° C., place a sample on a heating table quickly, start timing, then arrange the thick aluminum plate and a pressure sensor, and apply stress of 0.9±0.04 MPa.
4. Carry out heat preservation for 10 min, first disable a recording function of a multi-channel thermometer, then turn off a switch of the smart heater, detect the thickness of the sample with a plug gauge, record a plurality of channels of temperatures at the end of the test, retain a hot surface of the sample after the test, and measure heat-insulating temperature differences of the samples, wherein a higher heat-insulating temperature difference indicates a better heat-insulating property.

Test results are shown in Table 1:

TABLE 1

|  | Heat-insulating temperature difference (° C.) |
| --- | --- |
| Embodiment 1 | 474 |
| Embodiment 2 | 478 |
| Embodiment 3 | 470 |
| Comparative Example 1.2 | 465 |
| Comparative Example 2.2 | 469 |
| Comparative Example 3.2 | 462 |

An index requirement of a new-energy battery for a heat-insulating temperature difference of a heat-insulating sheet is greater than 460° C. It can be learned from Table 1 that all heat-insulating temperature differences in Embodiment 1 to Embodiment 3 of the present invention meet the requirement. This indicates that the nano-composite sheet prepared by the method in the present invention has a better heat-insulating property. The heat-insulating temperature differences in Embodiment 1 to Embodiment 3 are higher than those in Comparative Example 1.2, Comparative Example 2.2, and Comparative Example 3.2, respectively. This indicates that the additive B prepared by the method in the present invention can improve the heat-insulating property of the nano-composite sheet.

Experimental Example 2: Test for Flame-Retardant Property

Use an oxygen index meter to measure oxygen indexes of samples with reference to the GB/T 2406-2009 standard, wherein the test samples are nano-composite sheets prepared according to Embodiment 1 to Embodiment 3, Comparative Example 1.1, Comparative Example 2.1 and Comparative Example 3.1, and a higher oxygen index indicates a better flame-retardant property. Test results are shown in Table 2:

TABLE 2

|  | Oxygen index (%) |
| --- | --- |
| Embodiment 1 | 31.4 |
| Embodiment 2 | 31.0 |
| Embodiment 3 | 31.8 |
| Comparative Example 1.1 | 29.9 |
| Comparative Example 2.1 | 29.6 |
| Comparative Example 3.1 | 30.5 |

It can be learned from Table 2 that all oxygen indexes in Embodiment 1 to Embodiment 3 of the present invention are higher. This indicates that the nano-composite sheet prepared by the method in the present invention has a good flame-retardant property. The oxygen indexes in Embodiment 1 to Embodiment 3 are higher than those in Comparative Example 1.1, Comparative Example 2.1, and Comparative Example 3.1, respectively. This indicates that the additive A prepared by the method in the present invention can improve the flame-retardant property of the nano-composite sheet.

Embodiment 4

The heat-insulating and flame-retardant nano-composite sheet is prepared by the following steps:

S1: adding 50 parts of aerogel slurry, 0.5 part of aluminum hydroxide, 0.5 part of potassium hexatitanate whisker, 11 parts of fumed silica, 5 parts of high-silica glass fiber, and 0.3 part of an additive A into a stirring tank; and carrying out stirring until the materials are mixed uniformly to acquire pasty composite slurry, wherein the aerogel slurry is composed of silica aerogel powder and a wetting dispersion according to the weight ratio of 15:85; and the wetting dispersion is composed of sodium carboxymethyl cellulose, an additive B, water and ethanol according to the weight ratio of 1:1:50:40;

S2: filling a glue tray of a roller coating device with the composite slurry acquired in step S1; and scrape-coating surfaces of a plurality of layers of a base material with the composite slurry by using discharging assemblies of the roller coating device, wherein the number of the discharging assemblies is the same as the number of the layers of the base material, both of which are 15; the thickness of the composite slurry after scrape coating is 0.3 mm; and the base material is fiberglass felt whose thickness is 0.2 mm;

S3: drawing and collecting the plurality of layers of the base material acquired in step S2 at a compounding position; and carrying out pressurization to acquire a semi-finished product, wherein a pressure at the compounding position is 0.4 MPa; and a drawing speed for the plurality of layers of the base material is 1 m/min; and S4: drawing the semi-finished product acquired in step S3 onto a coating line; and carrying out high-temperature drying at 80° C. to acquire the heat-insulating and flame-retardant nano-composite sheet, wherein a drawing speed for the semi-finished product is 1 m/min.

Preparation steps of the additive A and the additive B are the same as those in Embodiment 1.

Embodiment 5

The heat-insulating and flame-retardant nano-composite sheet is prepared by the following steps:

S1: adding 55 parts of aerogel slurry, 1 part of magnesium hydroxide, 3 parts of zinc oxide, 12 parts of fumed silica, 6 parts of high-silica glass fiber, and 0.3 part of an additive A into a stirring tank; and carrying out stirring until the materials are mixed uniformly to acquire pasty composite slurry, wherein the aerogel slurry is composed of silica aerogel powder and a wetting dispersion according to the weight ratio of 20:80; and the wetting dispersion is composed of sodium carboxymethyl cellulose, an additive B, water and ethanol according to the weight ratio of 1:1:50:40;

S2: filling a glue tray of a roller coating device with the composite slurry acquired in step S1; and scrape-coating surfaces of a plurality of layers of a base material with the composite slurry by using discharging assemblies of the roller coating device, wherein the number of the discharging assemblies is the same as the number of the layers of the base material, both of which are 5; the thickness of the composite slurry after scrape coating is 0.4 mm; and the base material is fiberglass felt whose thickness is 4 mm;

S3: drawing and collecting the plurality of layers of the base material acquired in step S2 at a compounding position; and carrying out pressurization to acquire a semi-finished product, wherein a pressure at the compounding position is 0.6 MPa; and a drawing speed for the plurality of layers of the base material is 5 m/min; and S4: drawing the semi-finished product acquired in step S3 onto a coating line; and carrying out high-temperature drying at 90° C. to acquire the heat-insulating and flame-retardant nano-composite sheet, wherein a drawing speed for the semi-finished product is 5 m/min.

Preparation steps of the additive A and the additive B are the same as those in Embodiment 1.

Embodiment 6

The heat-insulating and flame-retardant nano-composite sheet is prepared by the following steps:

S1: adding 66 parts of aerogel slurry, 10 parts of an organosilicone flame retardant, 10 parts of aluminium oxide, 20 parts of fumed silica, 10 parts of high-silica glass fiber, and 0.6 part of an additive A into a stirring tank; and carrying out stirring until the materials are mixed uniformly to acquire pasty composite slurry, wherein the aerogel slurry is composed of silica aerogel powder and a wetting dispersion according to the weight ratio of 30:70; and the wetting dispersion is composed of sodium carboxymethyl cellulose, an additive B, water and ethanol according to the weight ratio of 1:1:50:40;

S2: filling a glue tray of a roller coating device with the composite slurry acquired in step S1; and scrape-coating surfaces of a plurality of layers of a base material with the composite slurry by using discharging assemblies of the roller coating device, wherein the number of the discharging assemblies is the same as the number of the layers of the base material, both of which are 20; the thickness of the composite slurry after scrape coating is 0.5 mm; and the base material is pre-oxidized fiber whose thickness is 3 mm;

S3: drawing and collecting the plurality of layers of the base material acquired in step S2 at a compounding position; and carrying out pressurization to acquire a semi-finished product, wherein a pressure at the compounding position is 0.7 MPa; and a drawing speed for the plurality of layers of the base material is 4 m/min; and S4: drawing the semi-finished product acquired in step S3 onto a coating line; and carrying out high-temperature drying at 150° C. to acquire the heat-insulating and flame-retardant nano-composite sheet, wherein a drawing speed for the semi-finished product is 4 m/min.

Preparation steps of the additive A and the additive B are the same as those in Embodiment 1.

Embodiment 7

The heat-insulating and flame-retardant nano-composite sheet is prepared by the following steps:

S1: adding 57 parts of aerogel slurry, 5 parts of an organosilicone flame retardant, 3 parts of magnesium oxide, 15 parts of fumed silica, 9 parts of high-silica glass fiber, and 0.5 part of an additive A into a stirring tank; and carrying out stirring until the materials are mixed uniformly to acquire pasty composite slurry, wherein the aerogel slurry is composed of silica aerogel powder and a wetting dispersion according to the weight ratio of 35:65; and the wetting dispersion is composed of sodium carboxymethyl cellulose, an additive B, water and ethanol according to the weight ratio of 1:1:50:40;

S2: filling a glue tray of a roller coating device with the composite slurry acquired in step S1; and scrape-coating surfaces of a plurality of layers of a base material with the composite slurry by using discharging assemblies of the roller coating device, wherein the number of the discharging assemblies is the same as the number of the layers of the base material, both of which are 10; the thickness of the composite slurry after scrape coating is 0.3 mm; and the base material is non-woven fabric whose thickness is 0.1 mm;

S3: drawing and collecting the plurality of layers of the base material acquired in step S2 at a compounding position; and carrying out pressurization to acquire a semi-finished product, wherein a pressure at the compounding position is 0.4 MPa; and a drawing speed for the plurality of layers of the base material is 2 m/min; and S4: drawing the semi-finished product acquired in step S3 onto a coating line; and carrying out high-temperature drying at 140° C. to acquire the heat-insulating and flame-retardant nano-composite sheet, wherein a drawing speed for the semi-finished product is 2 m/min.

Preparation steps of the additive A and the additive B are the same as those in Embodiment 1.

Embodiment 8

The heat-insulating and flame-retardant nano-composite sheet is prepared by the following steps:

S1: adding 64 parts of aerogel slurry, 8 parts of aluminum hydroxide, 4 parts of aluminum silicate, 16 parts of fumed silica, 7 parts of high-silica glass fiber, and 0.4 part of an additive A into a stirring tank; and carrying out stirring until the materials are mixed uniformly to acquire pasty composite slurry, wherein the aerogel slurry is composed of silica aerogel powder and a wetting dispersion according to the weight ratio of 25:75; and the wetting dispersion is composed of sodium carboxymethyl cellulose, an additive B, water and ethanol according to the weight ratio of 1:1:50:40;

S2: filling a glue tray of a roller coating device with the composite slurry acquired in step S1; and scrape-coating surfaces of a plurality of layers of a base material with the composite slurry by using discharging assemblies of the roller coating device, wherein the number of the discharging assemblies is the same as the number of the layers of the base material, both of which are 10; the thickness of the composite slurry after scrape coating is 0.4 mm; and the base material is pre-oxidized fiber whose thickness is 1 mm;

S3: drawing and collecting the plurality of layers of the base material acquired in step S2 at a compounding position; and carrying out pressurization to acquire a semi-finished product, wherein a pressure at the compounding position is 0.5 MPa; and a drawing speed for the plurality of layers of the base material is 3 m/min; and S4: drawing the semi-finished product acquired in step S3 onto a coating line; and carrying out high-temperature drying at 110° C. to acquire the heat-insulating and flame-retardant nano-composite sheet, wherein a drawing speed for the semi-finished product is 3 m/min.

Preparation steps of the additive A and the additive B are the same as those in Embodiment 1.

The foregoing embodiments only illustratively describe principles and effects of the present invention, and are not intended to limit the present invention. Any person familiar with this technology can make modifications or alterations to the foregoing embodiments without departing from the spirit and scope of the present invention. Therefore, all equivalent modifications or alterations made by any person of ordinary skill in the art without departing from the spirit and technical ideas disclosed in the present invention shall still fall within the scope defined by the claims of the present invention.

What is claimed is:

1. A preparation method of a heat-insulating and flame-retardant nano-composite sheet, comprising the following steps:
    S1: adding materials comprising an aerogel slurry, a flame retardant, an opacifying agent, fumed silica, a high-silica glass fiber, and a first additive into a stirring tank; and carrying out stirring until the materials are mixed uniformly to acquire a pasty composite slurry, wherein the aerogel slurry, the flame retardant, the opacifying agent, the fumed silica, the high-silica glass fiber, and the first additive are 50-70 parts by weight, 0.5-10 parts by weight, 0.5-10 parts by weight, 10-20 parts by weight, 5-10 parts by weight, and 0.3-0.6 parts by weight, respectively; the aerogel slurry is composed of silica aerogel powder and a wetting dispersion according to a weight ratio of (15-50): (50-85); and the wetting dispersion is composed of sodium carboxymethyl cellulose, a second additive, water, and ethanol according to a weight ratio of 1:1:50:40;
    S2: filling a glue tray of a roller coating device with the pasty composite slurry acquired in step S1; and scrape-coating surfaces of a plurality of layers of a base material with the pasty composite slurry by using discharging assemblies of the roller coating device;
    S3: drawing and collecting the plurality of layers of the base material acquired in step S2 at a compounding position; and carrying out pressurization to acquire a semi-finished product; and
    S4: drawing the semi-finished product acquired in step S3 onto a coating line; and carrying out high-temperature drying to acquire the heat-insulating and flame-retardant nano-composite sheet, wherein a temperature for the high-temperature drying is 80° C. to 150° C.,
    wherein the first additive is prepared by the following steps:
        adding heptamethyl trisiloxane, methylbenzene, 1,2-epoxy-7-octene, and a palladium-carbon catalyst according to a ratio of 1 mol:550 mL:1.05 mol:0.004 g into a first reaction flask; heating the first reaction flask to 85° C.; carrying out stirring for a first reaction for 8 hours to acquire a reaction liquid; performing rotary evaporation on the reaction liquid to remove the methylbenzene to obtain a first resulting product; and carrying out vacuum drying on the first resulting product at 80° C. until a weight of the first resulting product is constant to acquire the first additive; and
    the second additive is prepared by the following steps:
        adding choline chloride, methanol, and calcium hydroxide according to a ratio of 1 mol:500 mL:1 mol into a second reaction flask; heating the second reaction flask to 65° C.; carrying out stirring for a second reaction for 12 hours to acquire a reaction mixture; cooling the reaction mixture to room temperature and carrying out filtering to acquire a filtrate; performing rotary evaporation on the filtrate to remove the methanol to obtain a second resulting product; and carrying out vacuum drying on the second resulting product at 100° C. until a weight of the second resulting product is constant to acquire the second additive.

2. The preparation method of the heat-insulating and flame-retardant nano-composite sheet according to claim 1, wherein the flame retardant is magnesium hydroxide, aluminum hydroxide, or an organosilicone flame retardant; and the opacifying agent is one or more of ferrous oxide, carbon black, titanium dioxide, potassium hexatitanate whiskers, zinc oxide, aluminum oxide, magnesium oxide, and aluminum silicate.

3. The preparation method of the heat-insulating and flame-retardant nano-composite sheet according to claim 1, wherein in step S2, a number of the discharging assemblies is the same as a number of the plurality of layers of the base material, the number of the discharging assemblies and the number of the plurality of layers of the base material are 5 to 20; a thickness of the pasty composite slurry after the scrape-coating is 0.3 mm to 0.5 mm; the base material is a non-woven fabric, a fiberglass felt, or a pre-oxidized fiber; a thickness of the non-woven fabric is 0.1 mm to 1 mm; a thickness of the fiberglass felt is 0.2 mm to 4 mm; and a thickness of the pre-oxidized fiber is 1 mm to 3 mm.

4. The preparation method of the heat-insulating and flame-retardant nano-composite sheet according to claim 1, wherein in step S3, a pressure at the compounding position is 0.3 MPa to 0.8 MPa; and a drawing speed for the plurality of layers of the base material is 1 m/min to 5 m/min.

5. The preparation method of the heat-insulating and flame-retardant nano-composite sheet according to claim 1, wherein in step S4, a drawing speed for the semi-finished product is 1 m/min to 5 m/min.

6. A heat-insulating and flame-retardant nano-composite sheet prepared by the preparation method according to claim 1.

7. A heat-insulating and flame-retardant nano-composite sheet prepared by the preparation method according to claim 2.

8. A heat-insulating and flame-retardant nano-composite sheet prepared by the preparation method according to claim 3.

9. A heat-insulating and flame-retardant nano-composite sheet prepared by the preparation method according to claim 4.

10. A heat-insulating and flame-retardant nano-composite sheet prepared by the preparation method according to claim 5.

\* \* \* \* \*